Dec. 2, 1958 J. S. EDGAR 2,862,744
ROCK DRILL BIT SOCKET
Filed June 7, 1955

INVENTOR.
JOHN S. EDGAR
BY
ATTORNEYS

United States Patent Office 2,862,744
Patented Dec. 2, 1958

2,862,744

ROCK DRILL BIT SOCKET

John S. Edgar, St. Catharines, Ontario, Canada, assignor to Thompson Products, Ltd., St. Catharines, Ontario, Canada, a corporation of Ontario Application June 7, 1955, Serial No. 513,798

5 Claims. (Cl. 287—126)

The present invention relates to improvements in drill bit assemblies and, in particular, to those assemblies in which a rock drill bit is to be secured to a tool shank or the like.

In one presently employed rock drill bit assembly, the drill bit is provided with a socket having an alternate series of flat and round portions in its periphery to accommodate a tool shank which has a cross section shaped exactly complementarily to the cross sectional shape of the socket. The two members are joined by providing an interference fit between them and forcing the tool shank into the drill bit socket under considerable pressure.

The type of drill bit socket described has been generally satisfactory, but the necessity of manufacturing a socket having a relatively complex contour to rather close dimensional tolerances has frequently proved to be rather expensive.

Accordingly, an object of the present invention is to provide an improved drill bit assembly which can be manufactured at substantially less cost than the type of drill bit presently being employed.

Another object of the invention is to provide a drill bit and tool shank assembly including a more or less standard type of socket in the drill bit, thereby eliminating the necessity of expensive and time consuming machining operations in the formation of the socket.

Still another object of the invention is to provide a drill bit and tool shank assembly which will accommodate the tool shanks of various cross-sectional configuration, including those tool shanks which are irregular or off-sized.

Another object of the invention is to provide a method for attaching a drill bit to a tool shank.

The drill bit assembly of the present invention includes a drill bit having a substantially cylindrical socket which is considerably easier and less expensive to manufacture than the type of socket heretofore employed. This socket is arranged to receive a mounting shank which has a cross sectional configuration including an alternate series of flats and rounds. The rounds on the shank have a slightly larger radius than the radius of the circular socket, so that the rounds are received in press-fitted relationship within the socket. Initially, the flat portions of the tool shank are so dimensioned that they would be freely received within the circular socket. However, when the round portions of the tool shank are forced into the circular socket, the interference fit which results causes the material of the socket to flow inwardly into the spaces which would normally exist between the flats and the inner wall of the socket. This flow of metal automatically conforms the inner wall of the cylindrical socket to the contour of the tool shank and thereby locks the two elements together rigidly in a non-slipping engagement.

A further description of the present invention will be made in connection with the attached sheet of drawings which illustrates a preferred embodiment thereof.

Figure 1:
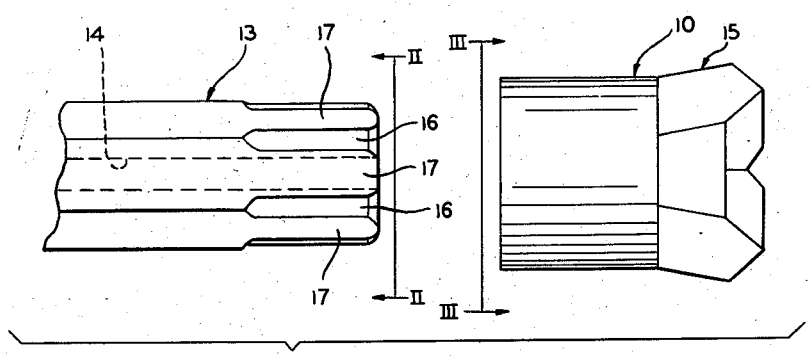
Figure 1 is an exploded view, with parts in elevation, illustrating the manner in which the tool shank is received within the drill bit socket.

In Fig. 1, reference numeral 10 indicates generally the socket portion of a drill bit 15 which may be any of a wide variety of drill bit configurations, the specific design of the cutting face of the bit forming no part of the instant invention.

Figure 3:
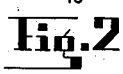
Figure 3 is an end view, taken along the line III—III of Fig. 1, illustrating the configuration of the socket.
Figure 4:
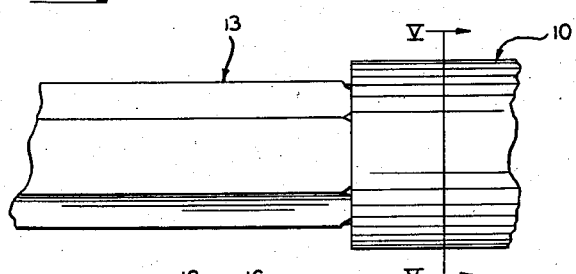
Figure 4 is a fragmentary view, with parts in elevation, illustrating the engaged position between the drill bit socket and the tool shank.

As best seen in Fig. 3, the socket 10 has a substantially cylindrical inner wall 11 and a centrally disposed aperture 12 for distributing drilling fluid to the cutting face of the tool.

Figure 2:
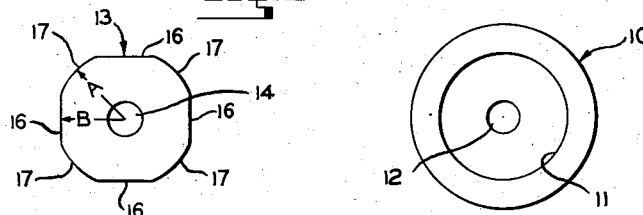
Figure 2 is an end view, taken along the line II—II of Fig. 1, illustrating the configuration of the tool shank.

The socket 10 is arranged to receive a tool shank 13 which has a central aperture 14 arranged to register with the aperture 12 in the socket 10. As seen in Fig. 1, the extreme end of the tool shank 13 is formed with an alternate series of flat portions 16 and round portions 17, the radius of curvature of the rounds 17 being greater than the perpendicular distance of the flats from the center of the tool shank. Specifically, the flat portions 16 are preferably chords of the circle whose radius coincides with the radius of the round portions 17. Referring to Fig. 2, the radius of the rounds has been designated at A, and the perpendicular distance from the flats 16 to the center has been designated as B. The tool shank is so sized that the distance A exceeds the distance B, and the distance A is also slightly greater than the radius of the inner cylindrical wall 11 of the socket 10. Normally, the difference in these two dimensions will be on the order of about 0.005 to 0.008 inch. The difference in radii thereby provides an interference fit between the rounds 17 and the inner wall 11 of the socket 10. The dimension B, however, is made less than the radius of the inner wall 11, so that normally a space would exist between the flats and the confronting portion of the wall 11.

Figure 5:
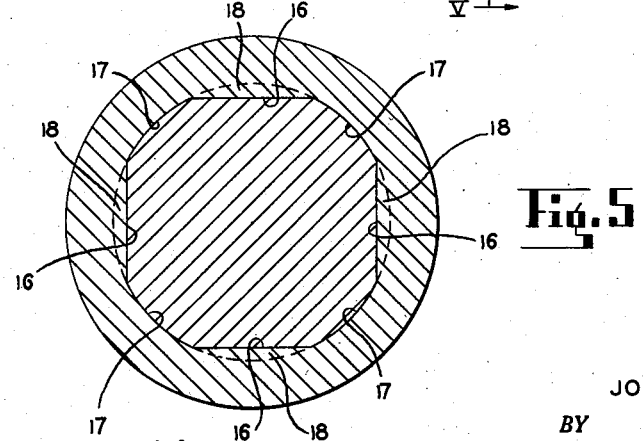
Figure 5 is an enlarged, cross-sectional view taken along the line V—V of Fig. 4, and illustrating the manner in which the metal flow of the socket provides the non-slipping engagement between the two members.

The tool shank 13 is inserted under pressure into the socket 10, and in doing so, the pressure is sufficient to cause the metal of the socket 10 to flow inwardly and to engage the flats 16 on the tool shank 13. As illustrated in Fig. 5 of the drawings, wherein the dotted line portion represents the original configuration of the cylindrical inner wall 11, numeral 18 indicates the segments of metal which have been forced around or extruded about the flats 16 to thereby rigidly engage the end of the shank 13 in non-slipping relation.

The performance of the drill bit assemblies of the present invention has been found to be at least equal to that of the previously employed drill bit assemblies, under the same conditions of usage. The assemblies of the present invention, however, are considerably more economical to manufacture because they can make use of cylindrical sockets which are much more economical to fabricate than sockets of an irregular contour. In addition, the cylindrical socket of the invention can accommodate slight irregularities in the contour of the tool shank, so that the latter need not be machined to closely limited tolerances. This results in an additional saving of expense and time.

It will be appreciated that various modifications can be made to the described embodiment without departing from the scope of the present invention.

I claim as my invention:

1. A drill bit assembly comprising a drill bit having a socket of circular cross-section and a mounting shank capable of being received in said socket, said shank having a cross-sectional configuration including an alternate series of flats and rounds, said rounds having a slightly larger radius than the radius of said socket so that rounds are capable of being received in press-fitted relationship within said socket and said flats being spaced from the center of said shank by a distance less than said radius of said socket, whereby forcing said shank into said socket causes the material of said socket to flow inwardly into the spaces which would normally exist between said flats and the inner wall of said socket.

2. A drill bit assembly comprising a drill bit having a socket of circular cross-section and a mounting shank received within said socket, said shank having a spaced series of flats and rounds on its periphery, said rounds being received into press-fitted engagement within said socket and the flats being spaced from the center of said shank by a distance less than the radius of said socket, and portions of the inner wall of said socket being deformed radially inwardly against said flats to lock said drill bit and said shank against relative rotative movement.

3. A drill bit assembly comprising a drill bit having a socket of circular cross-section and a mounting shank received within said socket, said shank including rounds and flats in a regular arrangement about its periphery, said flats being spaced from the center of said shank by a distance less than the radius of said socket said rounds being received in said socket in press-fitted engagement with portions of the inner wall of said socket being deformed radially inwardly against said flats to lock said drill bit and said shank against relative rotative movement.

4. In combination, a drill bit having a socket of circular cross-section and a mounting shank having rounds and flats about its periphery, said rounds being of sufficient radius to be received in an interference fit within said socket, and said flats being of shorter effective radius than said rounds, thereby providing slight gaps between said flats and the inner walls of said socket capable of accommodating the flow of metal from said inner wall upon insertion of said drill bit into said socket.

5. The method of securing a mounting shank to a drill bit which comprises providing a mounting shank having a periphery made up of rounds and flats, and a drill bit having a socket of circular cross-section, said rounds being of sufficient radius to be received in press-fitted engagement within said socket, and said flats being of smaller effective radius than said socket, pressing said shank into said socket, and deforming the inner wall of said socket into the spaces existing between said inner wall and said flats.

References Cited in the file of this patent

UNITED STATES PATENTS

| | | |
|---|---|---|
| 419,638 | Chantrell | Jan. 21, 1890 |
| 2,018,073 | Laise | Oct. 22, 1935 |
| 2,111,244 | Hueglin | Mar. 15, 1938 |
| 2,569,275 | Baker | Sept. 25, 1951 |
| 2,654,573 | Annesley | Oct. 6, 1953 |
| 2,708,249 | Pryslak | May 10, 1955 |